United States Patent [19]
Rudner et al.

[11] 3,914,189
[45] Oct. 21, 1975

[54] METHOD FOR PRODUCTION OF POLYURETHANE FOAM USING OXAZOLINES AS CATALYSTS

[75] Inventors: Bernard Rudner, Ridgewood, N.J.; Peter Daniel Pauly, Mountaintop, Pa.

[73] Assignee: Tenneco Chemicals, Inc., Saddle Brook, N.J.

[22] Filed: Mar. 15, 1974

[21] Appl. No.: 451,659

[52] U.S. Cl. .................. 260/2.5 AC; 260/2.5 AQ
[51] Int. Cl.² ................ C08G 18/14; C08G 18/20
[58] Field of Search.. 260/2.5 AC, 77.5 AC, 75 NC, 260/2.5 AQ, 77.5 AQ, 75 NQ

[56] References Cited
UNITED STATES PATENTS

| | | | |
|---|---|---|---|
| 3,446,779 | 5/1969 | Finelli et al. | 260/77.5 AC |
| 3,448,065 | 6/1969 | Green | 260/2.5 AC |
| 3,661,861 | 5/1972 | Hunsucker | 260/77.5 R |
| 3,743,626 | 7/1973 | Emmons | 260/77.5 AC |

*Primary Examiner*—M. J. Welsh
*Attorney, Agent, or Firm*—James P. Scullin

[57] ABSTRACT

As catalysts for the preparation of polyurethane foams, there are used oxazolines. These catalysts are less expensive, milder in odor, and less irritating than the conventional amine catalysts, which they may replace in whole or in part. They may also be used in conjunction with conventional metallic catalysts. Foams made with the oxazoline catalysts are characterized by low odor and improved resistance to aging.

14 Claims, No Drawings

METHOD FOR PRODUCTION OF POLYURETHANE FOAM USING OXAZOLINES AS CATALYSTS

FIELD OF THE INVENTION

This invention relates to the preparation of polyurethanes, and in particular to the use of novel catalysts in the preparation of polyurethanes. The novel catalysts are oxazolines.

GENERAL BACKGROUND OF THE INVENTION

Polyurethanes can be prepared by reacting a hydroxyl-terminated polyester, a hydroxyl-terminated polyether or other active hydrogen-containing compound, or mixtures thereof, with a di- or poly- isocyanate. A substantially non-porous product can be obtained by carrying out the reaction under substantially anhydrous conditions. If a cellular product, commonly termed a polyurethane foam, is desired, water can be included in the reaction mixture. Water reacts with -NCO groups in the isocyanate to form gaseous carbon dioxide, which become trapped in the reaction mixture as the mixture solidifies, to produce a cellular structure. In place of, or in addition to, water as a foaming agent there may be used volatile halogenated hydrocarbons such as monofluorotrichloromethane, and the like.

A variety of other ingredients may be incorporated into the reaction mixture to achieve specific purposes, as is well known in the art. These ingredients include: surfactants, foam stabilizers, cell openers, antioxidants, ultra-violet absorbers, microbicides, antistatic agents, flame retardants, fillers, dyes, and pigments.

Usually, a catalyst or a mixture of catalysts is included in the reaction mixture. Particularly in the preparation of poplyurethane foams, it is common practice to employ a mixture of catalysts in order to control the relative reaction rates of isocyanate groups with the hydroxyl groups of the polyester of polyether on the one hand, and the competing reaction of isocyanate groups with water.

Catalysts conventionally used in the art include metallic compounds, and amines and other nitrogenous compounds.

Among the metallic compounds known to be useful catalysts are salts or other derivatives of lead, antimony, iron, cobalt, mercury, zinc, and tin. Tin compounds such as dibutytin dilaurate, stannous chloride, stannous oleate, and stannous octoate have been found particularly satisfactory and have achieved widespread use in the industry.

The amino and other nitrogenous compounds found useful in the prior art include tertiary aliphatic amines such as triethylamine, cetyldimethylamine, and dimethylaminoethanol, alkylene diamines, N-substituted morpholines such as N-ethylmorpholine and N-"coco" morpholine, N,N'-disubstituted piperazines, 2,2,2-diazabicyclooctane, imidazoles, imidazolines, and others. Of particular industrial importance are triethylamine, cetyldimethylamine, the N-substituted morpholines, and 2,2,2-diazabicyclooctane.

It is well known in the art to employ two, three, four, or more catalysts in combination for the preparation of polyurethanes. Thus, the catalyst combination may comprise: a tertiary aliphatic amine and an N-substituted morpholine; stannous octoate and 2,2,2-diazabicyclooctane; stannous octoate, cetyldimethylamine, and N-ethylmorpholine; and so on. A most useful discussion of the art of catalysts for polyurethanes may be found in the two volume "Polyurethanes: Chemistry and Technology" by Saunders and Frisch, Interscience, New York, 1962 and 1964.

Although the prior art amine catalysts have provided an acceptable degree of catalytic activity in promoting the formation of polyurethanes, they have a number of drawbacks. They are expensive, toxic, irritating, and malodorous; and in some instances they catalyze the degradation of urethane polymers, due to their basic characteristics. The obnoxious odor of amine catalysts frequently carries through the curing cycle and persists in the finished polyurethane product. This has hampered, to some extent, the acceptance of polyurethane foam in such applications as mattresses, pillows, seat cushioning, and clothing. Hence, there has been a continuing search for improved, low-odor, catalysts for the formation of polyurethanes.

SUMMARY OF THE INVENTION

In accordance with the present invention, polyurethanes are prepared using 2-oxazolines as catalysts. For simplicity, the 2-oxazolines will be hereinafter referred to as "oxazolines." These compounds have the formula

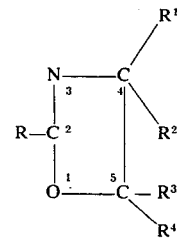

where R represents hydrogen or a hydrocarbyl group containing from 1 to 23 carbon atoms, where $R^1$, $R^2$, $R^3$ and $R^4$ represent hydrogen, hydrocarbyl groups containing from 1 to 7 carbon atoms or hydroxyl-substituted hydrocarbyl groups containing from 1 to 7 carbon atoms and where $R^1$, $R^2$, $R^3$ and $R^4$ may be the same or different.

These oxazolines are known compounds and may be prepared by known methods; but they have not previously been known to be catalysts for preparing polyurethanes. It is quite surprising that the oxazolines can be used in place of amines such as N-substituted morpholine for catalyzing polyurethane formation. They differ from the known amine catalysts in structure, being cyclic imino ethers, and in chemical and physical properties. Tne oxazolines, in comparison with the amines, are lower in cost, milder in odor, and less irritating. Also, many of the oxazolines are relatively non-toxic. In addition to being inherently milder in odor than many amines, the oxazoline which may remain in a finished polyurethane product such as a foam will hydrolyze under normal storage and use conditions to a stable, non-toxic, odorless amide. The amide is inactive and will not catalyze the degradation of the urethane polymer, which is one of the disadvantages of the amine catalysts.

The oxazolines may be prepared by a variety of well-known means. For example, 2-methyloxazoline is obtained by pyrolyzing N-acetylethanolamine at 260°C, and 2-phenyl-5-methyloxazoline is obtained by heating betabromopropylbenzamide with water followed by treatment with alkali to liberate the oxazoline from the hydrobromide which is initially formed. Oxazolines of the above formula wherein R is alkyl, $R^1$ and $R^2$ are hydroxylmethyl, and $R^3$ and $R^4$ are hydrogen can be made by heating fatty acids with tris(hydroxymethyl) aminomethane. Other syntheses are given in "Heterocyclic Compounds, Volume 5," edited by Elderfield, John Wiley, New York, 1957.

Examples of suitable catalyst are: oxazoline; 2-methyloxazoline; 2-ethyloxazoline; 2-decyloxazoline; 2-phenyl-4,4-bis(hydroxymethyl) oxazoline; 2-5-diphenyl-4-methyloxazoline; 2-octadecyl-4,4-dibutyloxazoline; 2-dodecyl-4-hydroxymethyl-5-heptyloxazoline; 2-docosyl-4-(2-hydroxyethyl-5,5-dihexyloxazoline; 2-isobutyl-4,4-bis(hydroxymethyl)-5-pentyl oxazoline; 2-hexyl-4,4-bis(isopropyl)-5-methyl-5-heptyl oxazoline; 2-octadecyl-4-(6-hydroxyhexyl)-4-ethyloxazoline; 2-octadecyl-4,4-bis(hydroxylmethyl)-5,5-diphenyloxazoline; 2-hexadecyl-5,5-bis(propyl) oxazoline; 2-nonadecyloxazoline; 2-heneicosyl-4,4-bis(hydroxylmethyl) oxazoline; 2-tricosyl-4,4-bis(hydroxymethyl) oxazoline; 2-allyl-5-methyloxazoline; 2-phenyl-4,4-dimethyloxazoline; 2-heptadecenyl-4,4-diethyloxazoline; 4,5-bis (betahydroxyethyl) oxazoline; 2-undecyl-4-(tetrahydroxybutyl) oxazoline; 4,5-diphenyloxazoline; 2-nonyloxazoline; 2-tridecyl-4,4-dipropyloxazoline; 2-heptyl-4-allyloxazoline; 2-"tall oil residue"-5-methyloxazoline; 2-"hydrogenated tallow residue"-4,4-bis(hydroxymethyl) oxazoline; and 2-"coco"-4,4-bis(hydroxylmethyl) oxazoline. In the three last-named compounds, the terms "tall oil residue," "hydrogenated tallow residue," and "coco" denote mixed alkyl groups derived from tall oil fatty acids, hydrogenated tallow fatty acids, and coconut oil fatty acids, respectively.

Polyurethanes are made in a number of forms for a variety of purposes. These include flexible foams, rigid foams, non-cellular elastomers, coatings, and adhesives. Polyurethane foams are made by a number of processes, such as one-shot, prepolymer, and quasi-prepolymer, which differ in detail but which all start from an active hydrogen-containing compound (usually a "polyol") and a di - or poly- isocyanate. The "polyols" are most frequently polyesters or polyethers which contain terminal hydroxyl groups. Castor oil and derivatives of castor oil, including the products obtained by alcoholysis with glycols, triols, and other low molecular weight polyhydroxy compounds, may also be used as polyols for reaction with isocyanates to form polyurethanes.

The polyester polyol reactants useful in the present invention include any conventionally used in the preparation of flexible, and semi-flexible urethane polymer foams. The polyhydric polyester reactant usually has a molecular weight of at least about 400 and optimally between about 500 and about 5000. The hydroxyl number of the compound is correspondingly in the range of from about 15 to about 300. Generally a polyester having a molecular weight of greater than about 10,000 is difficult to handle commercially because of the difficulty of completely mixing such a high viscosity compound into the reaction mixture. However, in circumstances where a high molecular weight reactant is desired and where the suitable powerful mixing apparatus is available, the higher molecular weight compound can be used; the only significant limitation is that the compound contain at least two active hydrogen groups, preferably hydroxyl groups. The preferred hydroxyl functionality for the polyester resins is from 2 to about 3, although higher or lower values may be useful for specific purposes.

The range of polyester polyol compounds useful for preparing the polyurethane foams in the present invention are well known to the art and can be prepared by, for example, the reaction of a polyhydric alcohol with a polycarboxylic acid compound, each containing from two to about 36 carbon atoms in the molecule. The polycarboxylic acid includes such acid precursors as the corresponding acid anhydrides or acid halides or even, for example, alkyl esters. The preferred acids are the dicarboxylic acids containing from about 4 to about 12 carbon atoms in the molecule. Examples of such preferred carboxylic acid compounds which can be used include, for example, aromatic acids such as phthalic acid, terephthalic acid, isophthalic acid, tetrachlorophthalic acid; cycloaliphatic acids such as dimerized linoleic acid, maleated and fumarated rosin acids, and cyclohexane-1,4-diacetic acid, but especially the aliphatic acids such as tricarballylic, oxydipropionic, succinic, glutaric, adipic, azelaic, suberic, sebacic acids, or combinations of such acids. The polyester polyols can also be prepared from corresponding lactones, such as γ-butyro; or ε-caprolactones, for example.

The polyhydric alcohol used in the preparation of these polyester polyols may be dihydric alcohol, or a mixture of a dihydric and a trihydric, or polyhydric alcohol of high hydroxyl value. Often, a mixture of polyols, the major portion having a functionality of two and the minor a functionality of three, is used. This mixture of di- and tri-functional polyols is utilized to give an average functionality of between two and three. A functionality of greater than two is desirable to provide cross-linking in the reaction between the polyester polyol and the polyisocyanate to form a flexible, but strong foam. It has been found to be preferable to obtain this additional functionality by using trihydric or higher polyols in a minor amount when forming the polyester polyol.

For preparing flexible foams, the polyols most preferably include the glycols, such as neopentyl glycol, ethylene glycol, diethylene glycol, hexamethylene glycol, 1,4- and 1,3-butylene glycol, 1,3- and 1,2-propylene glycol and the corresponding dipropylene glycols. The most useful monomeric triols include the aliphatic triols, such as trimethylolethane, trimethylolpropane, 1,2,4-butanetriol, 1,2,6-hexanetriol, glycerol, and triethanolamine. Aromatic polyols, such as trihydroxymethyl benzene, can also be used.

It is recognized that certain compounds which are considered by those skilled in the art as polyester resins also contain ether linkages, e.g., esters prepared from dipropylene glycol. However, the primary character of such resins is considered to be that of an ester.

In the practice of the present invention, the polyether polyol can also be selected from any of the wide variety of polyhydric polyether compounds available and conventionally used by the art for the preparation of polyether-type polyurethanes. The most common polyether polyol compounds, the polyoxyalkylene polyether polyols, are generally prepared by the reaction of an alkylene oxide with a polyhydric monomer. The polyhydric monomer can be selected from among the same polyhydric alcohols recited above for use in preparation of the polyester; preferably, however, a higher average functionality is useful for a polyether polyol.

Therefore, a higher proportion of trihydric polyols, such as glycerol, trimethylolethane and trimethylolpropane, or polyols with more than 3 hydroxyls, such as pentaerythritol, arabitol, sorbitol and xylositol are presently used in the mixture of monomers used to prepare the polyether polyols.

The alkylene oxides used in preparing the polyethers preferably are these which contain from two to about four carbon atoms, for example, ethylene oxide, 1,2-propylene oxide and 1,2-butylene oxide, and homopolymers and copolymers thereof. Other reactants can also be used in preparing the polyhydric polyalkylene ether, such as glycidol and cyclic ethers such as di- and tetramethylene ethers, and epihalohydrins, e.g., epichlorohydrin.

Also useful are the polyaralkylene ether polyols which are derived from the corresponding aralkylene oxides such as, for example, styrene oxide, alone or mixed with alkylene oxide.

Generally, propylene oxide, i.e. the 1,2-propylene oxide, and mixtures of 1,2-propylene oxide with ethylene oxide are preferred for the preparing of the polyether polyol reactant.

The polyethers for use in the present invention preferably have a molecular weight of from about 150 to about 4500 and optimally of from about 2800 to about 3800 and a hydroxy functionality of at least 2.0 to about 8.0, and preferably an average hydroxy functionality of from about 2.5 to about 5.0.

Further examples of the above conventional reactants are available in the literature. See, for example, Saunders and Frisch, supra.

The organic polyisocyanates useful in the present invention are also conventional. They contain at least two isocyanate groups per molecule. Preferably, the isocyanate mixture selected has an isocyanate functionality of from about 2 to about 3.0. The useful isocyanates include for example the aromatic, aliphatic, cycloaliphatic and heterocyclic polyisocyanates.

Suitable organic polyisocyanates include, for example, n-butylene di-isocyanate, methylene diisocyanate, m-xylylene diisocyanate, p-xylylene di-isocyanate, cyclohexyl-1,4-diisocyanate, dicyclohexylmethane-4,4'-diisocyanate, m-phenylene diisocyanate; p-phenylene diisocyanate, 3-(alphaisocyanatoethyl)-phenyl isocyanate, 2,6-diethylbenzene-1,4-diisocyanate, diphenyldimethylmethane-4,4'-diisocyanate, ethylidene diisocyanate, propylene-1,2-diisocyanate, cyclohexylene-1,2-diisocyanate, 2,4-tolylene diisocyanate. 2,6-tolylene diisocyanate, 3,3'-dimethyl-4,4'biphenylene diisocyanate, 3,3'dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthylene diisocyanate, and isophoron diisocyanate.

The aromatic diisocyanates are generally the least expensive and most reactive polyisocyanates available and, therefore, are preferred. The aromatic diisocyanates, especially the tolylene diisocyanate isomers are used commercially in the preparation of foam by the one-shot, continuous slab-stock process. However, for certain purposes, other polyisocyanates, especially the aliphatic, aralkyl and cycloalkyl polyisocyanates have valuable properties and can be used alone, or, if desired, in admixture with, e.g., tolylene diisocyanates. The aralkyl, aliphatic and cycloaliphatic polyisocyanates are especially useful when resistance against degradation and discoloration due to oxidation or light is needed. The aralkyl polyisocyanates are generally not useful alone, but can be used in combination with the other types for special purposes.

Generally, in carrying out the urethane polymerization reactions, the only significant groups in the reactant compounds are the isocyanate groups and active hydrogen groups which are reactive therewith. Any other group can be present in the reactants and in the urethane polymer, so long as the group does not interfere with the basic isocyanate-active hydrogen reaction. Acyclic, alicyclic, aromatic and heterocyclic radicals are all possible substituents on the active hydrogen and polyisocyanate reactants.

A single di- or poly-isocyanate may be used, as well as mixtures of two or more. It is common industrial practice when using tolylene diisocyanate to employ mixtures of the 2,4-and 2,6-isomers. Typical mixtures have 2,4-to 2,6-ratios ranging from 80/20 to 65/35.

A single polyester polyol or a mixture of two or more, or a single polyether polyol or a mixture of two or more, may be used. Also, mixtures of polyester polyols with polyether polyols may be employed.

It is recognized in the art that the preparation of commercially useful foam requires careful balancing of a number of factors, including not only the primary reactants recited above, but also the catalyst, surfactant, temperature, speed of feeding of the foaming mixture and other reaction conditions. The general procedures and problems of providing a balanced mixture are well known to those skilled in the art. It is a matter of routine to those so skilled to prepare a balanced formulation for use in a given process and with available apparatus.

For example, the proportions of the polyisocyanate reactant to the total polyhydric reactants, including water, can be varied as one means for changing the properties of the urethane foam desired. Usually, the total (—NCO) equivalent to total active hydrogen equivalent, i.e., polyether and polyester hydroxyl plus water, should be such as to provide a ratio of from about 0.70 to about 1.3 equivalents of —NCO per equivalent of active hydrogen, preferably a ratio of from about 1.0 to about 1.1 equivalent of -NCO per reactive hydrogen. Different ratios can be used; preferably, however, usually an excess of the isocyanate reactant is used in order to obtain a fully polymerized stable useful product. Foam having specifically desired properties often require the use of less than 1.0 equivalent of —NCO, for example, a hydrophilic foam; in this case an equivalence of 0.2 can be used when using a higher polyhydric alcohol.

The preferred foaming agent for general use in the production of polyurethane foam is water; water is a reagent that enters into the urethane polymerization reaction, with or without a secondary foaming agent, depending upon the desired final density of the foam. The water reacts with the isocyanate and releases carbon dioxide as a volatile by-product. Therefore, water must be included with the hydroxyl compounds when computing the -NCO-to-active-hydrogen ratio. Generally, when water is used, it is present in proportions of from about 0.5 to about 6 weight percent of water based on the total weight of the reacting polyols. Blowing agents which do not react with the isocyanate can be used, usually as an adjunct with water. These include compounds which are vaporized at the temperatures produced by the exotherm of the isocyanate-reactive hydrogen reaction. The various blowing agents are well known in the art and constitute no part of the present invention. Other blowing agents that are preferably used by the art include certain halogen-substituted aliphatic or cyclo aliphatic hydrocarbons having boiling points between about −40°C. to +70°C., including methylene chloride, the Freon fluorocarbons, such as trichloromonofluoromethane, dichlorodifluoromethane, and 1-chloro-2-fluoroethane; low boiling hydrocarbons such as propane, cyclopropane, butane, isobutane, pentane, hexane, cyclohexane and their mixtures and the like; and various thermally unstable compounds which liberate gases, e.g., $N_2$, upon heating, such as N,N-′ dimethyldinitrosoterephthalamides, are sometimes employed.

The amount of foaming agent present is varied to obtain the desired density of the foamed or cellular polymer product. Such proportions are well known to the art and are no part of the present invention. However, it is generally stated that for each hundred grams of reaction mixture containing an average isocyanate/reactive hydrogen ratio of about 1-to-1, about 0.005 to 0.03 mol of gas, such as the $CO_2$ released by the water-isocyanate reaction and/or vaporized Freon type blowing agents, can be used to provide densities ranging from 30 lbs. to 1 lb. per cubic foot respectively.

Emulsifier-surfactants suitable for use in the present invention include organosilicon compounds, usually polymers, which are hydrophilic and preferably water-soluble as well as soluble in at least one of the polyols. Such organo silicon surfactant-emulsifiers are well known to the art, described extensively in the published literature, and sold commercially. The commercially available organo silicon surfactant-emulsifiers are generally sold with specific instructions as to their suitability for polyether polyol-type or polyester polyol-type urethane foam production. Generally, a surfactant-emulsifier suitable for one polyol type is not suitable for use in a foaming reaction based on the other type. Further, these surfactant-emulsifiers are proprietary products, sold without disclosure as to their precise chemical structure. However, the surfactantemulsifiers used for polyether polyol-containing reaction mixtures are known to depress the surface tension to a greater extent than do the organo silicon surfactants used with polyester polyols.

Other foam stabilizing emulsifiers available for polyurethane foams can be used in combination with the organosilicon emulsifier-surfactants described above. Such useful emulsifiers include, in particular, nonionic emulsifiers, such as oxyethoxylated tall oil, ethoxylated alkyl phenols, and some anionic surfactants, such as sodium lauryl sarcosinate, and various oil-soluble sulphonates. It is also known that various materials useful as plasticizers in synthetic resin plastics tend to stabilize foams. Such materials include tricresyl phosphate; capped polyesters, e.g., the reaction product of a glycol, such as ethylene glycol, and a dicarboxylic acid, such as adipic acid, terminated by a monocarboxylic acid, such as acetic acid, or a monohydric alcohol, such as ethanol.

In addition, any of the various conventional pigments and fillers can be added, including carbon black and the various white or color pigments. Such particulate fillers preferably have a particle size of from about 1 to about 50 microns. Pigments generally are present in amount of from about 0.5 to about 15% by weight, based upon the total weight of the reaction mixture. For special purposes, highly filled polyurethane foams containing 50 percent, or even more, filler have been used. Pigments or fillers are preferably added as dispersions, either in aqueous or non-aqueous dispersions. Although the particulate material can be added as powder to the urethane reaction mixture, it is more common practice to utilize the pre-dispersed commercially available materials.

Inhibitors against discoloration and aging, flame retardants, anti-static agents, and other materials can also be added, if desired for the particular purpose for which the polyurethane is to be used.

Commercially, a catalyst is usually employed in the process of preparing a foamed polyurethane. Generally, a combination of two catalysts is conventionally used to catalyze two separate reactions which occur when using water as the foaming agent. A first catalyst is for the polymerization reaction between the isocyanate and the polyol, a second catalyst is for the blowing reaction between water and the isocyanates. The various catalysts useful for each type of reaction are well known in the art, see, for example, Saunders and Frisch, supra. It is commonly understood that tertiary amines are effective and tend to favor reaction of isocyanate with water, and that transition metal salts, and complexes, favor the polymerization reaction with the polyol.

The most preferred metal catalysts include tin compounds and iron compounds. Other metal compounds which can be used include compounds of cobalt, lead, vanadium, chromium, tungsten, antimony and titanium.

Useful tin compounds include stannous salts, e.g., stannous octoate, stannous acetate and stannous oleate, also stannic salts, e.g., stannic diacetate, stannic dioctoate, and the covalently linked organotin compounds such as dibutyltin diacetate and tributyltin oxide.

Examples of amine catalysts are: triethylamine, cetyldimethylamine, dimethylaminoethanol, N,N,N′,N′-tetramethyl-1,3-butanediamine, 2,2,2-diazabicyclooctane, N-ethylmorpholine, and N-"coco" morpholine.

Although a single amine catalyst may be used alone, it is more common practice to use a combination of two or more amine catalysts, or a combination of a metallic-catalyst and one or more amines. The amines are catalysts for both the water reaction and the hydroxyl reaction, whereas the tin catalysts are more powerful than the amines for the hydroxyl reaction but are not strong catalysts for the water reaction. Synergistic effects are frequently observed with combinations of amine and tin catalysts, wherein the combination is more effective for both reactions then either catalyst alone for either reactions. The amine catalysts vary in their catalytic activity with changes in their structure and molecular weight. Catalytic strength generally increases as the basicity of the amine increases. Relatively low molecular weight dimethyl alkyl amines are strong catalysts, and have a high vapor pressure so that their unpleasant odor tends to leave the foam quickly. They usually produce foams having poor compression set properties. Higher molecular weight homologs such as cetyldimethylamine are not as strong in catalytic activity, but lead to foams having better compression set. Due to their lower vapor pressure they remain in the foam for a long time, and consequently the unpleasant amine odor lingers in the foam. The substituted morpholines such as N-ethyl-and N"coco"-morpholines are intermediate in catalytic activity and effect on compression set. For this reason they have achieved commercial popularity despite their high cost, disagreeable odor, toxicity, and skin irritation property.

In accordance with the present invention, the conventional amine catalysts can be replaced in whole or in part with less costly, less toxic, and milder smelling oxazolines, to produce polyurethane foams having good compression set and other physical properties along with lower odor.

ILLUSTRATIVE EMBODIMENTS OF THE INVENTION

The practice of the invention is illustrated by the following examples. These examples are to be considered not limitative of the invention.

In the following examples, the various foams prepared were tested in accordance with the standard tests described in ASTM D-1564 for testing the physical properties of polyurethane foams. In these tests air permeability was determined by measuring the air flow at a constant pressure drop of 0.5 in. $H_2O$ across a sample of foam 1 inch thick and 2 in. × 2 in. square. The greater the amount of air flow in cubic feet per minute the greater the permeability. The "clickability" of the foams, a measurement of a foam's usefulness in die-cutting processes, was determined by placing a piece of foam 1 in. thick under a square die, 2½ × 2½ in. A foam passes the click test if the die cut piece has sharp edges on all sides and if it retains its original thickness and shape at the edges after cutting.

EXAMPLES 1–3

Cellular polyurethane buns were prepared by blending together the following ingredients; the amounts indicated being parts by weight.

|  | 1 | 2 | 3 |
| --- | --- | --- | --- |
| Polyester derived from diethylene glycol, trimethylol propane and adipic acid: mol. wt 2000, hydroxyl No. 52 | 100.0 | 100.0 | 100.0 |
| Silicone surfactant for polyurethane foam (1) | 1.20 | 1.20 | 1.20 |
| Stannous octoate | 0.05 | 0.05 | 0.05 |
| N-ethylmorpholine | 0.25 | 0.25 | — |
| Silicone-amine catalyst for polyester urethane foam (2) | 0.25 | — | 0.25 |
| 2-(mixed alkyl)-4,4-bis (hydroxymethyl) oxazoline (3) | — | 0.25 | 0.25 |
| Cetyldimethyl amine | 0.30 | 0.30 | 3.30 |
| Water | 3.60 | 3.60 | 3.60 |
| Tolylene diisocyanate (80/20 isomer ratio) | 44.6 | 44.6 | 44.6 |
| Index | 104 | 104 | 104 |
| Cream time (sec.) | 10 | 10 | 10 |
| Rise Time (sec.) | 75 | 95 | 85 |

(1) Proprietary product sold by Union Carbide Corporation as "L-532" a solubilizer for amine catalyst/water premixes and a stabilizer of foam structure. Typical physical properties are: viscosity at 25/25°C, 500 cstk; specific gravity at 25/25°C, 1.003; cloud point, 1% aqueous solution, above 95°C. See Product Information Brochure F–42286, dated January, 1969.
(2) Proprietary product sold by Union Carbide Corporation as "NIAX CATALYST ES" a substitute for N-ethylmorpholine for catalyzing the reaction of organic isocyanates with polyester polyols and water. Typical physical properties are: viscosity at 25°C, 20 cstk; specific gravity at 25°C, 0.97; pour point, −17°C, solubility in water, infinite; cloud point, 60 to 65°C; vapor pressure at 20°C, less than 0.28 mm Hg; flash point, Cleveland open cup, 210°F. See Product Information brochure F 42171, dated November 1968.
(3) Mixed alkyls derived from coconut oil fatty acids.

The resultant foams, representative of non-clickable, peeling-grade polyester polyurethanes, had the physical properties shown in Table I.

TABLE I

| Physical Properties: | 1 | 2 | 3 |
| --- | --- | --- | --- |
| Density, lb./cu. ft. | 1.714 | 1.767 | 1.734 |
| ILD, 4", 25% | 44.8 | 50.5 | 51.0 |
| % Resilience | 27.8 | 22.2 | 25.0 |
| Air Permeability (cfm) | 0.12 | 0.34 | 0.10 |
| Tensile Strength, lb./sq. in. | 16.7 | 19.5 | 15.0 |
| Elongation, % | 171 | 199 | 157 |
| Tear, Strength, lb./in. | 3.20 | 3.60 | 3.45 |
| Compression Set: 90% 22 Hrs. | 77.0 | 20.3 | 55.0 |
| 90% 6 Hrs. | 35.3 | 10.0 | 14.7 |
| Cell Count | 48 | 44 | 46 |
| Burning Rate, in./min. | 4.62 | 3.33 | 4.21 |
| Clickability | Poor | Poor | Poor |

The results show that foams made with the oxazoline catalyst have significant advantages. The foam of Example 2 had improved ILD, air permeability, tensile strength, tear strength, elongation, compression set, and burning rate as compared with the foam of Example 1. The odor of the foam of Example 2 was slightly less intense than that of Example 1. The foam of Example 3, as compared with that of Example 1, had improved ILD, tear strength, compression set, and burning rate. The odor of the foam of Example 3 was substantially less intense than that of Example 1.

EXAMPLES 4–7

Additional peeling-grade foam buns were prepared by blending together the following ingredients.

|  | 4 | 5 | 6 | 7 |
| --- | --- | --- | --- | --- |
| Polyester derived from diethylene glycol, trimethylol propane, and adipic acid: mol. wt 2000, hydroxyl no. 52 | 100.0 | 100.0 | 100.0 | 100.0 |
| Silicone surfactant for polyester urethane foam(1) | 1.20 | 1.20 | 1.20 | 1.20 |
| Stannous octoate | 0.05 | 0.05 | 0.05 | 0.05 |
| N-ethylmorpholine | 0.25 | 0.25 | — | 0.25 |
| Silicone-amine catalyst for polyester urethane foam (2) | 0.25 | — | 0.25 | 0.25 |
| 2-(mixed alkyl)-4,4-bis (hydroxymethyl) oxazoline (3) | — | 0.40 | 0.50 | 0.90 |
| Cetyldimethylamine | 0.30 | 0.30 | 0.30 | — |
| Water | 3.60 | 3.60 | 3.60 | 3.60 |
| tolylene diisocyanate (80/20 isomer ratio) | 44.6 | 44.6 | 44.6 | 44.6 |
| Index | 104 | 104 | 104 | 104 |

-continued

| | | | | |
|---|---|---|---|---|
| Rise time (sec.) | 75 | 105 | 75 | 95 |

(1) Proprietary product sold by Union Carbide Corp. as "L-532".
(2) Proprietary product sold by Union Carbide Corp. as "NIAX CATALYST ES".
(3) Mixed alkyls derived from coconut oil fatty acids.

These resultant foams had the physical properties listed in Table II.

Table II

| Physical Properties: | 4 | 5 | 6 | 7 |
|---|---|---|---|---|
| Density, lb./cu. ft. | 2.00 | 2.23 | 2.07 | 2.16 |
| Tensile Strength, lb./sq. in. | 16.4 | 19.0 | 16.0 | 16.8 |
| Elongation, % | 126 | 214 | 157 | 153 |
| Tear Strength, lb./in. | 1.75 | 4.00 | 2.50 | 2.60 |
| Compression Set: | | | | |
| 90% 22 Hrs. | 77.0 | 24.0 | 57.0 | 21.0 |
| 90% 6 Hrs. | 21.0 | 10.4 | 10.1 | 8.0 |

The results demonstrated the superiority of the novel oxazoline catalyst. The higher density of the foams of Examples 5, 6, and 7 is advantageous: to obtain the same density as the foam of Example 4, additional water would be used, resulting in lower cost. Example 5, as compared with comparative Example 4, had better tensile strength, elongation, tear strength, and compression set. In these two examples, in which the very expensive silicone-amine catalyst was replaced by a low-cost oxazoline, it was observed that there was less eye and skin irritation during preparation of the foam when the oxazoline was used, and that the odor of the finished foam was milder. Similar advantages were found when comparing Example 7 with Example 4: replacement of cetyldimethylamine with the oxazoline catalyst produced a foam having better elongation, tear strength, and compression set, and a milder odor. Replacement of the more expensive N-ethylmorpholine with the oxazoline catalyst (comparison of Example 6 with Example 4) produced a foam having better elongation, tear strength, and compression set. The finished foam of Example 6 had a much improved, significantly milder, odor. During the preparation of this foam, the operator experienced less skin irritation.

EXAMPLES 8–10

Three polyether urethane foams were prepared in which oxazolines were used as replacements for diazabicyclooctane. In the following formulations, the amounts are parts by weight.

| | 8 | 9 | 10 |
|---|---|---|---|
| Propoxylated glycerol (mol. wt. 3000, hydroxyl No. 56) | 200.0 | 200.0 | 200.0 |
| Ethoxypropoxylated polysiloxane (viscosity 1700 cs at 25°C) | 2.6 | 2.6 | 2.6 |
| Trichloromonofluoromethane | 12.6 | 12.6 | 12.6 |
| Water | 7.8 | 7.8 | 7.8 |
| Tolylene diisocyanate (80/20 isomer ratio) | 102.0 | 102.0 | 102.0 |
| Stannous octoate | 0.7 | 0.7 | 0.7 |
| Diazabicyclooctane/dipropylene glycol mixture, 1/2 weight ratio | 0.6 | — | — |
| 2-(mixed alkyl)-4,4-bis (hydroxymethyl) oxazoline (1) | — | 0.6 | — |
| 2-(mixed alkyl)-4,4-bis (hydroxymethyl) oxazoline (2) | — | — | 0.6 |
| Index | 110 | 110 | 110 |
| Cream time (sec.) | 10 | 10 | 10 |
| Rise time (sec.) | 90 | 125 | 125 |

(1) Mixed alkyls derived from coconut oil fatty acids.
(2) Mixed alkyls derived from hydrogenated tallow acids.

The resultant foams had the physical properties shown in Table III.

Table III

| Physical Property: | 8 | 9 | 10 |
|---|---|---|---|
| Density, lb./cu. ft. | 1.34 | 1.09 | 1.16 |
| Resilience, % | 36.1 | 45.8 | 45.8 |
| Tensile strength, lb./sq. in. | 12.0 | 17.9 | 13.8 |
| Tear strength, lb./in. | 1.5 | 1.9 | 2.0 |
| Elongation, % | 130 | 259 | 188 |

The results show that the foams made with the less costly oxazoline catalysts, as compared with Example 8, had improved physical properties, even though density was lower. The lower density is advantageous, since for most applications foam is sold by volume rather than by weight.

EXAMPLES 11–14

A series of clickable grade polyester foams was prepared on a pilot scale, conventional, continuous foaming apparatus. The following were made consecutively, on the same day. The polyester polyol was pumped at the rate of 50 pounds per minute. In the following formulations, the amounts are parts by weight.

| | 11 | 12 | 13 | 14 |
|---|---|---|---|---|
| Polyester derived from diethylene glycol, trimethylolethane, and adipic acid: mol wt. 2500, hydroxyl no. 56 | 100.0 | 100.0 | 100.0 | 100.0 |
| Tolylene diisocyanate (65/35 isomer ratio) | 50.1 | 50.1 | 50.1 | 50.1 |
| Stannous octoate solution (50% in cresyl diphenyl phosphate) | 0.2 | 0.2 | 0.2 | 0.2 |
| Water | 3.7 | 3.7 | 3.7 | 3.7 |
| Surfactant (1) | 1.5 | 1.5 | 1.5 | 1.5 |
| N-ethylmorpholine | 0.5 | 0.5 | 0.5 | 0.5 |
| Cetyldimethylamine | 0.3 | 0.3 | 0.3 | 0.3 |
| Carbon black dispersion (12%, in tricresyl phosphate) | — | 7.45 | 7.45 | — |
| N-"coco" morpholine solution (80%, in mineral oil) | 1.0 | 1.0 | — | — |
| 2-(mixed alkyl)-4,4-bis | | | | |

|  | 11 | 12 | 13 | 14 |
|---|---|---|---|---|
| (hydroxymethyl) oxazoline solution (2) (80% in mineral oil) | — | — | 1.0 | 1.0 |
| Index | 111 | 111 | 111 | 111 |

(1) Non-silicon surfactant sold by Witco Chemical Corp. as "M-66-82".
(2) Mixed alkyls derived from coconut oil fatty acids.

These foams had the following properties:

|  | 11 | 12 | 13 | 14 |
|---|---|---|---|---|
| Density, lb./cu. ft. | 1.65 | 1.78 | 1.76 | 1.66 |
| Cell count, pores per inch | 29 | 30 | 26 | 28 |
| Permeability, cfm | 3.8 | 3.5 | 3.2 | 2.0 |
| Tensile strength, lb./sq. in. | 19.9 | 20.1 | 22.2 | 22.1 |
| Tear strength, lb./in. | 3.8 | 3.8 | 4.0 | 4.1 |
| Elongation, % | 173 | 182 | 208 | 191 |
| ILD 2", 25% | 48.9 | 44.3 | 48.9 | 50.0 |
| Compression set, 90% 22 hr. | 12.2 | 12.8 | 13.1 | 8.3 |
| Clickability | good | good | good | good |

During the foaming, it was observed that skin contact with the reaction mass of Examples 11 and 12 caused severe irritation, whereas there was no irritation from contact with the reaction mass of Examples 13 and 14.

The odors of Examples 13 and 14 both during and after foaming were less objectionable than those of Examples 11 and 12.

EXAMPLES 15 AND 16

Two open-pore filter-grade foams were prepared from a mixture of polyester polyol and polyether polyol, using the following formulations in which the quantities are parts by weight.

|  | 15 | 16 |
|---|---|---|
| Polyester derived from diethylene glycol, trimethylolpropane, and adipic acid: mol. wt. 2000, hydroxyl no. 52 | 85.0 | 85.0 |
| Propoxylated glycerol (mol. wt. 3000, hydroxyl no. 56 | 15.0 | 15.0 |
| Tolylene diisocyanate (80/20 isomer ratio) | 42.2 | 42.2 |
| Ethoxypropoxylated polysiloxane | 3.5 | 3.5 |
| Polydimethylsiloxane (viscosity 50 cs at 25°C) | 0.6 | 0.6 |
| Stannous octoate solution (50% in cresyl diphenyl phosphate) | 0.14 | 0.14 |
| Water | 3.5 | 3.5 |
| Diazabicyclooctane solution (33%, in dipropylene glycol) | 0.25 | 0.25 |
| Carbon black dispersion (30%, in water) | 4.0 | 4.0 |
| N-ethylmorpholine | 0.1 | — |
| 2-ethyloxazoline | — | 0.1 |
| Index | 108 | 108 |

Both foams were equally open-celled and free from membranes. Examples 16, unlike Example 15, was free of odor and irritation, both during and after foaming. Example 16 gave off less fumes during the foaming operation. The foam of Example 16 had better physical properties, and had slightly larger cells. Larger cells are desirable in a filter-grade foam.

EXAMPLES 17 AND 18

The following foams were made without a metal-containing catalyst, to illustrate the utility of the novel oxazoline catalyst when used alone. In the formulations, all quantities were parts by weight.

|  | 17 | 18 |
|---|---|---|
| Polyester derived from diethylene glycol, trimethylol propane, and adipic acid: mol. wt. 2000, hydroxyl no. 52 | 100.0 | 100.0 |
| Silicone surfactant for polyester urethane foam (1) | 1.2 | 1.2 |
| Water | 3.6 | 3.6 |
| Tolylene diisocyanate (80/20 isomer ratio) | 44.6 | 44.6 |
| Cetyldimethylamine | 4.0 | — |
| 2-Pentadecyloxazoline | — | 4.0 |
| Cream time, sec. | 18 | 15 |
| Rise time, sec. | 120 | 90 |
| Tack-free time, hr. | > 24 | < 16 |

(1) Sold by Union Carbide Corporation as "L-532".

These two examples show that the replacement of cetyldimethylamine by an oxazoline having the same number of carbon atoms produced a faster forming and faster curing foam. In addition, the foam of Example 18 was free of irritation and milder in odor.

EXAMPLES 19 AND 20

The following two polyether urethanes were prepared. The quantities in the formulations are parts by weight.

|  | 19 | 20 |
|---|---|---|
| Proproxylated glycerol (mol. wt. 3000, hydroxyl No. 56) | 200.0 | 200.0 |
| Ethoxypropylated polysiloxane (viscosity 1700 cs at 25°C) | 2.6 | 2.6 |
| Water | 7.8 | 7.8 |
| Tolylene diisocyanate (80/20 isomer ratio) | 102.0 | 102.0 |
| Dibutyltin dilaurate | 0.1 | 0.1 |
| Benzyldimethylamine | 0.6 | — |
| 4-Phenyloxazoline | — | 0.6 |

The foam of Example 20 was crisper and stronger than that of Example 19, and the reaction mass during the foaming was far less irritating to the nose, eyes, and skin.

We claim:

1. In a method for the production of polyurethane foam from a reaction mixture comprising at least one organic isocyanate having at least two isocyanate groups per molecule and at least one polyol in the presence of a blowing agent, the improvement which comprises effecting the reaction in the presence of a catalytic amount of a catalyst comprising a compound of the formula

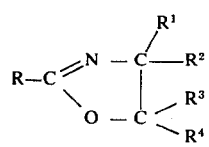

where R represents hydrogen or a hydrocarbyl group containing from 1 to 23 carbon atoms, $R^1$, $R^2$, $R^3$ and $R^4$ represent hydrogen, hydrocarbyl groups having from 1 to 7 carbon atoms or hydroxy-substituted hydrocarbyl groups having from 1 to 7 carbon atoms, and where $R^1$, $R^2$, $R^3$, and $R^4$ may be the same or different.

2. The method of claim 1 wherein the catalyst also comprises at least one tertiary amine.

3. The method of claim 1 wherein the catalyst also comprises a metal-containing catalyst.

4. The method of claim 3 wherein the metal-containing catalyst is stannous octoate.

5. The method of claim 1 wherein the catalyst also comprises at least one tertiary amine and a metal-containing catalyst.

6. The method of claim 1 wherein the polyol is a hydroxyl-terminated polyester.

7. The method of claim 1 wherein the polyol is a hydroxyl-terminated polyether.

8. The method of claim 1 wherein the polyol is a mixture of a hydroxyl-terminated polyester and a hydroxyl-terminated polyether.

9. The method of claim 1 wherein the reaction mixture also comprises a silicon surfactant.

10. The method of claim 1 wherein the catalyst comprises a compound having the formula

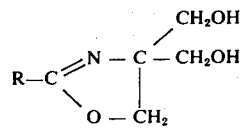

where R represents a mixture of alkyl groups derived from coconut oil fatty acids.

11. The method of claim 1 wherein the catalyst comprises a compound having the formula

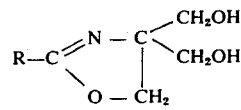

where R represents a mixture of alkyl groups derived from hydrogenated tallow acids.

12. The method of claim 1 wherein the catalyst comprises 2-ethyloxazoline.

13. The method of claim 1 wherein the catalyst comprises 2-pentadecyloxazoline.

14. The method of claim 1 wherein the catalyst comprises 4-phenyloxazoline.

* * * * *